United States Patent
Long et al.

(10) Patent No.: US 11,803,529 B2
(45) Date of Patent: Oct. 31, 2023

(54) UNBALANCED BINARY TREE CONSTRUCTION METHOD BASED ON CALCULATION OF BINARY BOUNDARY VALUE

(71) Applicant: CHANGSHA XINHONG SOFTWARE LTD., Hunan (CN)

(72) Inventors: Hui Long, Hunan (CN); Zhijian Guan, Hunan (CN)

(73) Assignee: Changsha Xinhong Software, LTD, Hunan (CN)

( * ) Notice: Subject to any disclaimer, the term of this patent is extended or adjusted under 35 U.S.C. 154(b) by 278 days.

(21) Appl. No.: 17/285,002

(22) PCT Filed: Oct. 14, 2019

(86) PCT No.: PCT/CN2019/111033
§ 371 (c)(1),
(2) Date: Sep. 16, 2021

(87) PCT Pub. No.: WO2020/083062
PCT Pub. Date: Apr. 30, 2020

(65) Prior Publication Data
US 2022/0179837 A1     Jun. 9, 2022

(30) Foreign Application Priority Data
Oct. 25, 2018  (CN) .......................... 201811246950.7

(51) Int. Cl.
   *G06F 16/22*          (2019.01)
(52) U.S. Cl.
   CPC ...... *G06F 16/2246* (2019.01); *G06F 16/2272* (2019.01)

(58) Field of Classification Search
   CPC ..... G06F 16/2246; G06F 16/2272; G06F 8/20
   See application file for complete search history.

(56) References Cited

U.S. PATENT DOCUMENTS

2002/0095422 A1* 7/2002 Burrows ............. G06F 16/9027
2016/0350380 A1* 12/2016 Finis ................. G06F 16/24562

FOREIGN PATENT DOCUMENTS

CN         101593366 A  * 12/2009  ........... G06F 16/134
WO     WO-2013185852 A1 * 12/2013  ........... G06F 16/134

OTHER PUBLICATIONS

J. Nievergelt and E. M. Reingold. Binary search trees of bounded balance. 1972. In Proceedings of the fourth annual ACM symposium on Theory of computing (STOC '72). Association for Computing Machinery, New York, NY, USA, 137-142. https://doi.org/10.1145/800152.804906 (Year: 1972).*

(Continued)

*Primary Examiner* — James E Richardson
(74) *Attorney, Agent, or Firm* — Jie Tan; JT Law Services, PC

(57) ABSTRACT

Each node of the binary tree contains an integer key value. When a new node is inserted into the binary tree, if the new node has a key value not equal to the key value of a node in the binary tree, there are necessarily a smaller key value A and a greater key value B, a binary boundary value C is calculated using the key values A and B; the relation between the new node and the node in the binary tree and the route for the new node to be inserted are determined based on the binary boundary value C. If $A \neq 0$, there must be an odd integer N and an integer power F of 2 for the key values A and B to satisfy $(N-1) \times F < A \leq N \times F$ and $N \times F \leq B < (N+1) \times F$, then the binary boundary value $C = N \times F$; and if $A=0$, then the binary boundary value C is equal to 0.

5 Claims, 4 Drawing Sheets

(56) References Cited

OTHER PUBLICATIONS

Douglas Comer. Ubiquitous B-Tree. ACM Computing Surveys. vol. 11, No. 2. Jun. 1979, pp. 121-137. https://doi.org/10.1145/356770.356776 (Year: 1979).*

Michael Freeston. A general solution of the n-dimensional B-tree problem. 1995. In Proceedings of the 1995 ACM SIGMOD international conference on Management of data (SIGMOD '95). Association for Computing Machinery, New York, NY, USA, 80-91. https://doi.org/10.1145/223784.223796 (Year: 1995).*

Muñoz et al. Efficient Certificate Revocation System Implementation: Huffman Merkle Hash Tree (HuffMHT). In: Trust, Privacy, and Security in Digital Business. TrustBus 2005. Lecture Notes in Computer Science, vol. 3592. Springer, Berlin, Heidelberg. https://doi.org/10.1007/11537878_13 (Year: 2005).*

Fu et al. Unbalanced tree-formed verification data for trusted platforms. (2016) Security Comm. Networks, 9: pp. 622-633. doi: 10.1002/sec.1385. (Year: 2016).*

* cited by examiner

A = 80

| 0 | 1 | 0 | 1 | 0 | 0 | 0 | 0 |

A - 1 = 79

| 0 | 1 | 0 | 0 | 1 | 1 | 1 | 1 |

| 0 | 1 | 0 | 0 | 1 | 1 | 1 | 1 |

B = 91

| 0 | 1 | 0 | 1 | 1 | 0 | 1 | 1 |

(A - 1) XOR B = 20

| 0 | 0 | 0 | 1 | 0 | 1 | 0 | 0 |

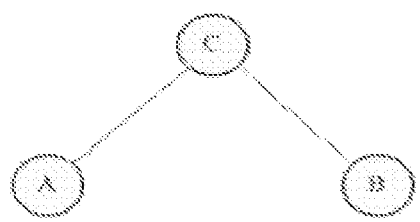
FIG. 6
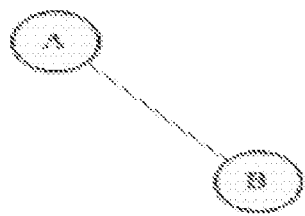
FIG. 7
FIG. 8

UNBALANCED BINARY TREE CONSTRUCTION METHOD BASED ON CALCULATION OF BINARY BOUNDARY VALUE

CROSS-REFERENCE

Priority is claimed from PCT/CN2019/111033 filed on Oct. 14, 2019 which claims the priority of China Patent Application No. 201811246950.7 filed on Oct. 25, 2018, which is hereby incorporated by reference.

DESCRIPTION OF RELATED ART

The present invention relates to the field of computer system software programming, and in particular, to unbalanced binary tree construction method based on calculation of binary boundary value in the basic data structure of computer.

In the field of computer software programming, the binary tree is commonly used data structure for fast search of data by key value. Common ones are AVLTree, RBTree and binary RadixTree, wherein AVLTree and RBTree need to readjust position of other nodes through rotation operation after inserting new nodes in the construction process to achieve balance or approximate balance of nodes number distribution and the depth of the left subtree and the right subtree, also need to readjust position of other nodes when deleting the nodes. Although adjusting the balance can significantly improve the search speed for subsequent search operation, in the application scenes where the total number of nodes is large and nodes need to be frequently added and deleted, these two binary trees will cause excessive overhead and performance degradation due to frequent adjustment. In practical application scenes such as network application scene, RadixTree is used, whether it is binary or multiple RadixTree, although there is no need to readjust the nodes, which causes large overhead, it requires a lot of extra memory to construct the search route, causing huge waste of memory resource.

SUMMARY

The objective of the present invention is to overcome the above-mentioned defects of the prior art and provide unbalanced binary tree construction method based on calculation of the binary boundary value, in the process of constructing the binary tree, the relation between the new node and the node in the binary tree is determined on basis of calculation of the binary boundary value.

The technical principle of the present invention is: in the process of inserting a new node into the binary tree, if the key value of the new node is not equal to the key value of the node in the binary tree, then the value space must be continuously divided in half by dichotomy to find the binary boundary value that can divide the two key values into different areas, so as to determine the relation of the two nodes and the route of the inserted node. For example, when the key value of the new node and the node in the binary tree are not equal, there are necessarily a smaller key value A and a greater key value B. First, divide the entire value space in half, if A and B are in the high half, then continue to divide the high half in half. If both A and B are in the low half of the second division, then continue to divide the low half in half until A and B can be divided into two different value space. This division point is binary boundary value C that needs to be calculated.

The technical solution provided by the present invention is: in order to facilitate calculation based on the aforementioned principle, the entire value space is set to integer power of 2, obviously A and B are finally divided into two different value space with width F which is also integer power of 2. According to the rule of dividing the value space by the dichotomy, since the value space where A located is divided from 2 times of F width value space, the boundary values of the value space where A located and the value space where B located must be at odd number of F width position in the entire value space, wherein the binary boundary value $C=N \times F$, N is an odd number, F is X power of 2, and X is an integer. In the computer system, the X power of 2 is expressed as binary number 1 left shifted by X binary bits, wherein $F=1<<x$. The binary boundary value C makes the key values A and B satisfy the following conditions at the same time based on the aforementioned principle: $(N-1) \times F < A \leq N \times F$ and $N \times F \leq B < (N+1) \times F$ where A and B are integers and $A \neq 0$. On basis of the above condition and the characteristic that the lowest bit of the odd number in the computer binary number representation is 1, it can be known that the result of the binary XOR operation on N and N−1 is equal to 1. Because the key value A may be equal to the binary boundary value C, the key value A minus 1 for $(N-1) \times F \leq A-1 < N \times F$, to ensure that the bit X of A−1 must be 0 and the bit X of the key value B must be 1, so that the bit X of the intermediate value M obtained by the binary XOR operation on the value of A−1 and the key value B is equal to 1. Then use the binary bit scanning operation from high bit to low bit to find the bit X which is first equal to 1 in the intermediate value M, and then the value of $F=1<<x$ can be calculated finally, the binary boundary value C can be obtained by rounding the key value B based on the coefficient F. For the special case of A=0, C=0. Then determine the relation between the new node and the current node in the binary tree based on the binary boundary value C.

When A<C<B, first create a boundary node with the key value equal to C, if the key value of the new node is A, the new node is the left leaf node of the boundary node, the current node in the binary tree is the right leaf node of the boundary node. If the key value of the new node is B, the new node is the right leaf node of the boundary node, the current node in the binary tree is the left leaf node of the boundary node, finally, insert the boundary node into the position of the current node in the binary tree.

When C=A, if the key value of the new node is A, the current node in the binary tree is the right leaf node of the new node, and insert the new node into the position of the current node in the binary tree. If the key value of the new node is B, then judge whether the right leaf node of the current node in the binary tree is empty, if it is empty, the new node is the right leaf node of the current node in the binary tree, if it is not empty, repeat the above procedure to determine the relation between the new node and the right leaf node.

When C=B, if the key value of the new node is B, the current node in the binary tree is the left leaf node of the new node, and insert the new node into the position of the current node in the binary tree. If the key value of the new node is A, then judge whether the left leaf node of the current node in the binary tree is null, if it is null, the new node is the left leaf node of the current node in the binary tree, if it is not null, repeat the above procedure to determine the relation between the new node and the left leaf node.

Compared with the prior art, the present invention has the following characteristics: the present invention describes a method of constructing binary tree by performing simple integer calculation on the key value of the new node and the node in the binary tree to obtain the binary boundary value, and then determining the relation between the new node and the node in the binary tree based on the binary boundary value. Compared with the prior art, the present invention has the remarkable advantages of simplicity, rapidness and low memory consumption, and is suitable for application scenes where nodes are added and deleted frequently.

BRIEF DESCRIPTION OF THE DRAWINGS

The disclosed application will be described with reference to the accompanying drawings, which show important sample embodiments of the invention and which are incorporated in the specification hereof by reference, wherein:

FIG. 4 is the schematic diagram of the binary value for the key value A minus 1.

FIG. 5 is the schematic diagram of the binary value for key value A minus 1 followed by XOR operation with key value B.

FIG. 6 is the schematic diagram of the binary value for key value B rounded on basis of coefficient F.

FIG. 7 is the schematic diagram of the relation between the corresponding nodes of the key values A and B as well as the boundary node, when the binary boundary value C satisfies the condition of A<C<B.

FIG. 8 is the schematic diagram of the relation between the key value A and corresponding node of key value B, when key value A is equal to the binary boundary value.

DETAILED DESCRIPTION OF SAMPLE EMBODIMENTS

Figure 1:
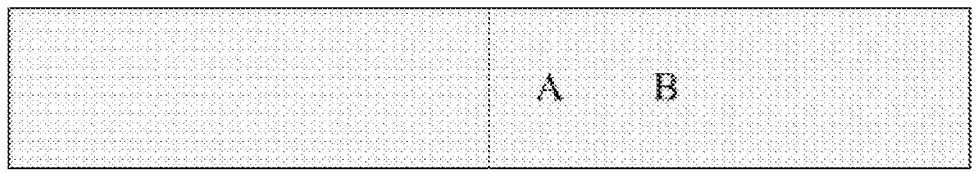
FIG. 1 is the first time for dividing the entire value space in half.

The numerous innovative teachings of the present application will be described with particular reference to presently preferred embodiments (by way of example, and not of limitation). The present application describes several embodiments, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

Figure 2:
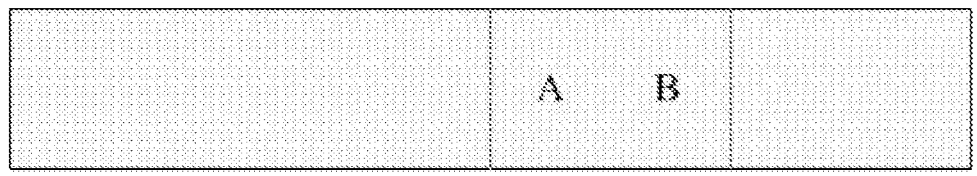
FIG. 2 is the second time for dividing half of the value space in half.
Figure 3:
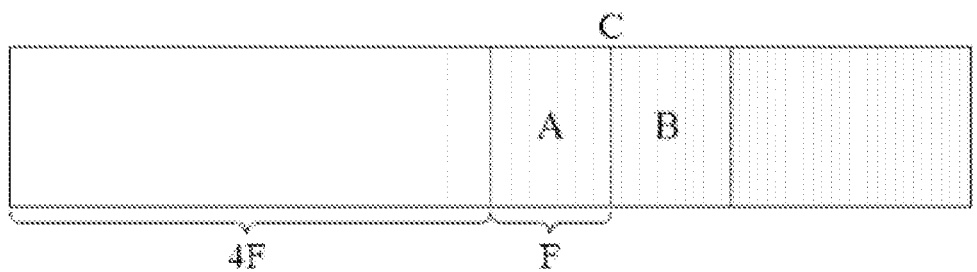
FIG. 3 is the third time for dividing the value space to find the binary boundary value C.

As shown in FIG. 1, FIG. 2 and FIG. 3: the principle of binary boundary value calculation comes from the relation of space and position revealed by dichotomy division for the value space, the key values A and B are finally divided into different area in the figure. It can be seen from the figure that the area where the key value A located must be divided from 2F width space, so whether the areas where A and B located before the division are at even number of 2F width positions or odd number of 2F width positions in the total space, the boundary value of the areas where A and B located after the division must be at odd number of F width positions in the total space. On basis of the characteristics of odd numbers in binary representation, the relation between the key values A and B in the value space can be used to perform binary XOR operation to find the binary bit corresponding to the coefficient F, and further calculate the binary boundary value C.

As shown in FIG. 4, FIG. 5 and FIG. 6: in the process of calculating the binary boundary value, first the key value A minus 1, and then perform the binary XOR operation with the key value B to obtain the intermediate value, and then use the bit scanning operation to find that the binary X corresponding to the coefficient F is equal to 4, wherein the binary value 1 is shifted left by 4 binary bits to obtain coefficient F, and finally the key value B is rounded on basis of coefficient F by performing AND operation on complement of coefficient F and the key value B binary.

Figure 9:
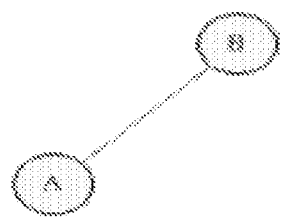
FIG. 9 is the schematic diagram of the relation between the key value B and the corresponding node of the key value A, when the key value B is equal to the binary boundary value.

As shown in FIG. 7, FIG. 8 and FIG. 9: determine the relation between nodes based on the binary boundary value C. When A<C<B, create an additional boundary node C as the key value, the node corresponding to key value A is the left leaf node of the boundary node, and the node corresponding to key value B is the right leaf node of the boundary node. When C=A, the node corresponding to key value B is the right subnode of A. When C=B, the node corresponding to key value A is the left leaf node of B.

The present invention relates to binary arithmetic operation in computer system, in particular to binary scanning operation, there is special instruction on some processor platforms providing hardware support to improve performance, for example on x86 platform of Intel, BSR instruction can be used to quickly get the bit which is up to 1 in the target value. Technicians in this field can skillfully use relevant machine instructions of the platform on different processor platforms to achieve this operation. For processor platforms that do not provide hardware support, technicians in this field can also use it skillfully and are not limited to dichotomy and table lookup to obtain the bit which is up to 1 in the target value. These differences in implementation cannot be interpreted as beyond the scope of the present invention.

Explanation of Nouns

XOR operation: is basic binary operation in computer system, when the two corresponding binary bit values of the XOR operation are the same, the result of the operation is 0, and when the two corresponding binary values of the XOR operation are different, the result of the operation is 1.

AND operation: is basic binary bit operation in computer system, when the two corresponding binary values of the AND operation are the same, the result of the operation is 0, otherwise the result is 0.

Complement: the negative number form of integer operation is represented by the complement in computer system, wherein the complement of integer F is equal to 0 minusing F.

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method for constructing an unbalanced binary tree data structure in a computer having programmed hardware and computer chips for computer data processing based on calculation of binary boundary value, each node in the binary tree contains an integer key value, the method comprising the steps of:
    obtaining an integer key value for a new node that is being inserted into the binary tree;
        determining that the key value of the new node is not equal to the key value of a current node in the binary tree;
            letting the smaller key value between the current node and the new node as A and the greater key value as B;
            first calculating an integer binary boundary value C that sits within the value spam defined by the key values A and B;
            then determining a relationship between the new node and the node in the binary tree based on the binary boundary value C; and
        determining a route to insert the new node according to the binary boundary value C; and
        inserting the new node into the binary tree according the route;
    wherein C is obtained by satisfying conditions as follows using binary operations: if $A \neq 0$, an odd integer number N and an integer power F of 2 are obtained so that the key values A and B satisfy $(N-1) \times F < A \leq N \times F$ and $N \times F \leq B < (N+1) \times F$ at the same time, and the binary boundary value $C = N \times F$; if $A = 0$, the binary boundary value $C = 0$.

2. The method of claim 1, wherein the binary boundary value C is obtained via binary operations as follows:
    determining that the key value $A \neq 0$, first performing the key value A minus 1; and then performing binary XOR operation with the key value B to obtain the intermediate value M; and then performing the binary scanning operation from high bit to low bit to find the bit X which is the first equal to 1 in the intermediate value M;
    shifting 1 left by X bits to obtain coefficient F; and finally performing binary AND operation on the complement of coefficient F and the key value B to obtain the binary boundary value C.

3. The method of claim 1, wherein the new node is inserted into the binary tree by determining the route as follows: when the relationship between the binary boundary value C and key values A and B is $A < C < B$, first creating a boundary node with the key value equal to C;
    wherein if the key value of the new node is A, the new node is used as the left leaf node of the boundary node, and the current node in the binary tree is used as the right leaf node of the boundary node;
    if the key value of the new node is B, the new node is used as the right leaf node of the boundary node, and the current node in the binary tree is used as the left leaf node of the boundary node; and
    finally, the boundary node is inserted into the position of the current node in the binary tree.

4. The method of claim 1, wherein the new node is inserted into the binary tree by determining the route as follows:
    when the binary boundary value C and the key value A are equal,
        if the key value of the new node key value is A, then the current node in the binary tree is used as the right leaf node of the new node, and inserting the new node into the position of the current node in the binary tree;
        if the key value of new node key value is B, determining whether the right leaf node of the current node in the binary tree is null, if it is null, the new node is used as the right leaf node of the current node, if it is not null, determine the relation between the new node and the right leaf node based on the key value and calculation of their binary boundary value.

5. The method of claim 1, wherein the new node is inserted into the binary tree by determining the route as follows:
    when the binary boundary value C and the key value B are equal,
        if the key value of the new node is B, the current node in the binary tree is used as the left leaf node of the new node, and inserting the new node into the position of the current node in the binary tree; if the key value of the new node is A, then determining whether the left leaf node of the current node in the binary tree is null, if it is null, the new node is used as the left leaf node of the current node; if it is not null, continue to determine the relationship between the new node and the left leaf node based on the key value and calculation of their binary boundary value.

* * * * *